F. T. FARMER.
WHEEL.
APPLICATION FILED APR. 18, 1911. RENEWED JULY 16, 1917.
1,239,580.
Patented Sept. 11, 1917.
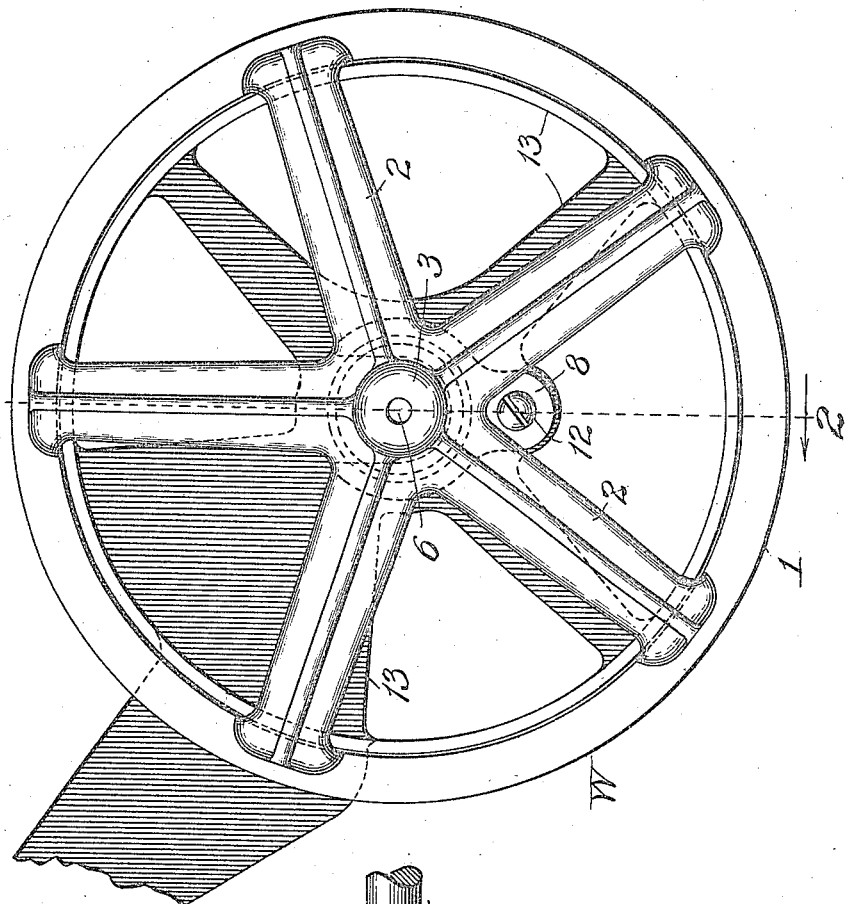
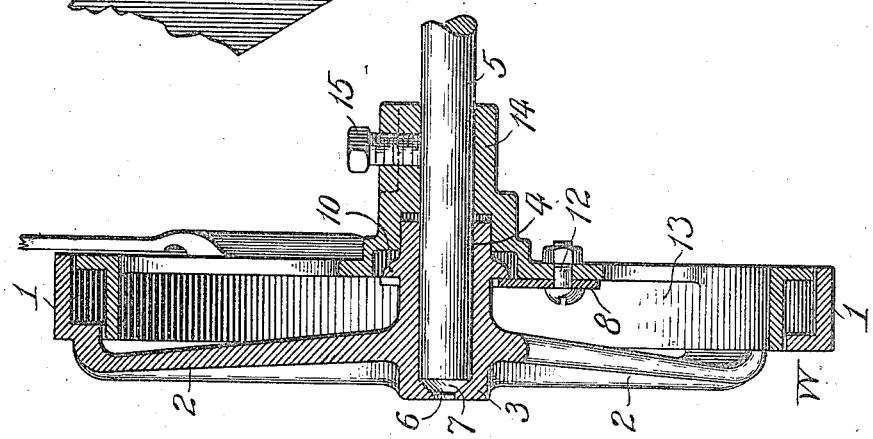
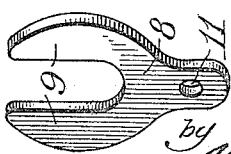
Witnesses:
John Enders
A. A. Thomas
Inventor:
Frank T. Farmer
by Wallace R. Lane Atty

UNITED STATES PATENT OFFICE.

FRANK T. FARMER, OF CHICAGO, ILLINOIS, ASSIGNOR TO THE WHITMAN & BARNES MANUFACTURING COMPANY, OF AKRON, OHIO.

WHEEL.

1,239,580.      Specification of Letters Patent.      Patented Sept. 11, 1917.

Application filed April 18, 1911, Serial No. 621,924. Renewed July 16, 1917. Serial No. 180,941.

*To all whom it may concern:*

Be it known that I, FRANK T. FARMER, a citizen of the United States, residing at Chicago, in the county of Cook and State of Illinois, have invented a certain new and useful Improvement in Wheels, of which the following is a specification.

The object of my invention is to provide a wheel especially adapted for mounting on the end of a shaft or axle and having a hub or bearing portion which is closed at its outer end except for a small opening to provide for the introduction of a lubricant. By means of this hub construction, the bearing is so inclosed as to be effectively protected from dust or other foreign substances. By arranging the small opening at the outer end of the hub substantially in line with the axis of rotation of the wheel, the lubricant may be readily inserted even when the wheel is revolving at a high rate of speed, and is prevented from being thrown out by centrifugal force by the conical shaped chamber in the outer end of the hub.

Suitable means is provided for retaining the wheel in position on the end of the shaft without interfering with the free rotation of the wheel.

Referring to the accompanying drawing, Figure 1 is a front elevation of a wheel embodying my invention; Fig. 2 is a section on 2—2 of Fig. 1, Fig. 3 is a detailed perspective view of a preferred form of device for retaining the wheel upon the end of the shaft.

In the particular form herein illustrated for clearness the wheel "W" consists of the periphery 1, the spokes 2, the hub or bearing portion 3, having a cylindrical bore 4 for receiving the end of the shaft 5. At its outer end the hub is provided with a restricted opening 6 for receiving the lubricant. The opening 6 is formed substantially in line with the axis of rotation of the wheel, whereby the lubricant may be inserted while the wheel is revolving. It will also be seen that the conical shaped chamber 7 prevents the lubricant from being thrown out through the opening 6 by centrifugal force.

In the embodiment shown in the drawing the bore 4 and opening 6 communicate through the conical recess or chamber 7 from which the lubricant is automatically fed between the bearing surface of the hub and shaft.

As a simple and efficient means of retaining the wheel on the end of the shaft without interfering with the free rotation of the wheel I have provided a retaining device 8, provided with a pair of spaced arms 9, which extend on opposite sides of the hub and engage a peripherical flange 10, formed on the hub. The retaining member 8 has an opening 11 through which the bolt 12 or other suitable fastening means extends for rigidly supporting the member 8 on the frame work 13.

The frame 13 in the drawing has for the sake of convenience been shown as part of a lawn mower, since my invention is particularly adapted to this class of device although by no means limited thereto. The precise configuration of the wheel shown in the drawing is not of the essence of my invention and has been shown merely because the frame 13 is part of a lawn mower.

The frame 13 is provided with a bearing portion 14 in which the shaft 5 is held by means of the set screw 15 or other suitable means.

Having thus described my invention what I claim as new and desire to secure by Letters Patent of the United States is:

1. In apparatus of the class described, a support, a shaft mounted therein, a hub having a bore therein for receiving the end of the shaft said hub tapering beyond the shaft to form a thrust bearing for the same and having an aperture at the extremity of its tapered portion, a flange on said hub and a fork secured to said support and engaging said flange to retain said hub on said shaft.

2. In apparatus of the class described, a support, a shaft thereon, a wheel having a hub revolubly mounted on said shaft, said hub projecting beyond the end of said shaft to form an outwardly converging chamber provided with an aperture whereby is afforded a receptacle for a lubricant and also a thrust bearing for the end of the shaft, said hub being provided with a flange, retaining means secured to said support and engaging said flange.

In witness whereof, I hereunto subscribe my name this 11 day of April, A. D. 1911.

FRANK T. FARMER.

Witnesses:
M. H. DOOLEY,
A. A. THOMAS.